(12) United States Patent
Pellenc (10) Patent No.: US 7,644,564 B2
(45) Date of Patent: Jan. 12, 2010

(54) ELECTRIC MODULAR PRUNING AND/OR TOPPING MACHINE

(75) Inventor: Roger Pellenc, Pertuis (FR)

(73) Assignee: PELLENC, Societe Anonyme, Pertuis (FR)

( * ) Notice: Subject to any disclaimer, the term of this patent is extended or adjusted under 35 U.S.C. 154(b) by 340 days.

(21) Appl. No.: 11/469,861

(22) Filed: Sep. 2, 2006

(65) Prior Publication Data

US 2007/0056260 A1    Mar. 15, 2007

(30) Foreign Application Priority Data

Sep. 9, 2005   (FR) .................................. 05 09201

(51) Int. Cl.
*A01D 69/00* (2006.01)
(52) U.S. Cl. .............................. 56/11.9; 56/233; 56/331
(58) Field of Classification Search ................ 56/328.1, 56/330, 11.9, 233–237, 331
See application file for complete search history.

(56) References Cited

U.S. PATENT DOCUMENTS

| | | | |
|---|---|---|---|
| 3,396,521 A * | 8/1968 | McKibben et al. ............ 56/330 |
| 4,074,869 A * | 2/1978 | Johnson ........................ 241/55 |
| 4,310,999 A * | 1/1982 | Onoue .......................... 56/295 |
| 4,455,815 A | 6/1984 | Grant | |
| 5,551,220 A | 9/1996 | Suller et al. | |
| 5,606,851 A * | 3/1997 | Bruener et al. ............... 56/11.9 |
| 5,839,263 A * | 11/1998 | Biernath et al. ............... 56/255 |

FOREIGN PATENT DOCUMENTS

| | | |
|---|---|---|
| DE | 4240866 | 6/1994 |
| FR | 2412436 | 7/1979 |
| FR | 2594630 | 8/1987 |
| FR | 2832024 | 5/2003 |
| FR | 2850328 | 7/2004 |

* cited by examiner

*Primary Examiner*—Alicia M Torres
(74) *Attorney, Agent, or Firm*—Egbert Law Offices PLLC (57) ABSTRACT

A modular pruning machine used in agriculture, viticulture, fruit growing, tree growing or for brush clearing has at least one cutter bar. The cutter bar has cutting modules affixed thereto. Each of the cutting modules has a rotary cutting tool and a three-phase asynchronous electric motor such that the three-phase asynchronous electric motor individually rotatably drives the rotary cutting tool.

16 Claims, 10 Drawing Sheets

ELECTRIC MODULAR PRUNING AND/OR TOPPING MACHINE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns an electric modular pruning and/or topping machine that can be used in agriculture, viticulture, fruit or tree growing or for brush clearing.

2. Description of Related Art Including Information Disclosed Under 37 CFR 1.97 and 37 CFR 1.98.

More specifically, in the area of viticulture, machines of the trimmer, topper, pruner types are known of, that comprise cutter bars consisting of a row of blades with reciprocating movement, or of moving blades attached onto a belt or chain winding on two wheels spaced out and cutting the shoots whenever the teeth of a fixed counter-blade run by (see for example FR-2.239.191, FR-2.329.191, FR-2.019.417).

It is understood that these heavy, bulky and costly cutter bars cannot be standardized so as to fit all shapes of shrubs (vine stocks or others) to be pruned and/or topped, so that the manufacturers are led to propose a large variety of models, which causes investment and storage problems. In addition, the actuation of these cutter bars during operation requires significant power usage, and they become foul very fast, which impedes a clean cut.

Machines of the above-mentioned type are also known of (e.g., FR-2.423.142, FR-2.594.630, FR-2.787.966, FR-2.832.024), in which the horizontal and vertical cutting assemblies consist of rotary cutting tools, placed side-by-side or over-under, rotationally driven by hydraulic motors and pulleys and transmission belts.

In the above-mentioned FR-2.594.630 document, each cutting assembly consists of modules assembled one after the other, each module being made of a contoured modular casing that is attached, through an inserted box and a ball bearing, to a hollow shaft on which are mounted, on one side, a blade (5), and on the other side, a double pulley, the pulley of one of the modules being driven by a hydraulic motor, while the modules not directly motorized are driven through their double pulleys and belts.

The FR-2.832.024 document describes a trimmer cutter bar made of a plurality of over-under cutting modules mounted along a structural beam and comprising a double blade rotary knife. One of the modules is rotationally driven by an hydraulic motor that also drives a pulley so that the rotary movement is transmitted to the knife of the adjacent module that in turns transmits it to the cutting component of the next module (and so on if the cutter bar has more than three cutting modules), each time through a pulley and a transmission belt.

The cutting systems using rotary knives driven by hydraulic motors and transmission belts, whether based on a modular construction or not, have the following disadvantages:

- difficult to achieve and maintain proper tension of the transmission belts so that the belts slip and overheat; tension adjustment of one of the belts often causes the tension of other belts to go out of adjustment;
- obligation to align the rotational drive shafts of the knives so that the cutter bars can only be rectilinear;
- necessity to have the transmission belts enclosed in a housing so as to eliminate the risks of getting caught in the vegetation, which impedes access to said belts, if needed;
- risk of environmental pollution in case of oil leaks; and
- difficult to provide high rotation speeds to the cutting tools although they are necessary to get clean cuts.

Other major disadvantages of hydraulic modular cutting systems include:

- complex assembly, including many hydraulic hoses lacking flexibility and cumbersome; and
- significant weight making the cutter bar heavy.

Multiple-row hydraulic toppers in particular require connection in series of the hydraulic motors. Such connection is limited as the differential pressures rapidly become inadequate to achieve the required cuts per motor. In addition, this series connection has the major disadvantage of pressure loading the shaft seals that thus become very fragile, which quickly causes leaks. To correct this disadvantage, it is necessary to add a drain hose so that the shaft seals are not pressurized.

Such mounting makes the assembly even more complex as the drain hoses must return directly to the hydraulic tank without any connector or coupler so as to prevent the slightest back-pressure.

Beyond 4 to 6 hydraulic motors mounted in series, the problems becomes such that no manufacturer tries larger mountings. It is therefore necessary for multi-row machines to use multiple flow dividers mounted one after the other, which causes oil wire-drawing that generated heat difficult to eliminate. The output of such an arrangement is very poor.

In addition, it should be pointed out that although machines with rotary knifes have been used for many years and offer the advantage of being able to work at fast forward speeds, this cutting system has the disadvantage of generating spatters and more specifically small leaf confetti that are harmful to the health of the vine and are very often carriers of cryptogamic diseases. These machines are also accused of being dangerous. However, European standards have been developed to protect the operator. The machines that give good results during the first topping in June on young shoots, work much less well as soon as the wood is lignified upon the second run, but mainly when topping before harvesting. On the hard wood, the vegetation is indeed shaken, which is harmful to the crop; the cuts are not clean and injuries to the wood are here also disease carriers.

The remedy to correct these disadvantages has been known for a long time since to prevent spatters and make clean cuts, it is necessary that, for example, the knives of approx. 34 cm diameter turn at high speeds above 3000 RPM. However, these high speeds cannot be easily achieved with hydraulic motors.

A pruning machine has already been proposed (U.S. Pat. No. 4,455,815) that comprises a cutter bar consisting of the juxtaposition of cutting devices, each containing a rotary cutter bar and a direct current electric motor for the individual rotational drive of this tool, all individual drive motors being supplied with direct current from a battery.

This device has serious disadvantages because of the use of direct current electric motors. The direct current supply indeed leads to using brush-type motors with a limited lifetime or motors without brushes, but using costly electronics. In addition, the rotation speed of those motors is not constant as it varies based on the torque. Finally, the cost price of these motors is generally high.

It has also been proposed (e.g., FR-2.412.436 and FR-2.850.328) to achieve the electric drive of agricultural tools from the power takeoff of an agricultural tractor, via a system transforming the mechanical energy into electric energy, this system comprising an electric generator, such as an alternator, a transmission permitting to connect the tractor power takeoff to the alternator rotor, this electric generator permitting to supply the electric drive motor of one or more agricultural machines. However, these are documents that describe a drive principle for machines, such as for example, grass mowers, but they do not address the applications of this principle to specific fields, and consequently not the solutions to problems that such applications may pose.

BRIEF SUMMARY OF THE INVENTION

This invention concerns an electric modular pruning and/or topping machine designed among other things to correct the above-mentioned disadvantages of the machines described in the various above-mentioned documents.

The invention concerns the application of said principle to the specific field of pruning or topping machines.

According to a first characteristic arrangement, the pruner and/or topper under the invention is noteworthy in that it comprises at least one cutter bar basically consisting of the juxtaposition of cutting modules, each comprising a rotary cutting tool and an individual three-phase asynchronous electric motor that rotationally drives said tool.

Because of this modular construction, it is possible to quickly and easily adapt the architecture or conformation of the machine cutter assembly based on the specific work to be performed.

According to another characteristic arrangement, the cutter bar comprises an elongated structural frame, for example consisting of a metal tube, onto which the cutting modules are mounted, one after the other, in a removable and interchangeable manner.

According to one embodiment, the structural member making up the "backbone" of the cutter bar can be rectilinear, but according to another characteristic arrangement, it features at least one curved, recessed or protruding portion.

Therefore, the cutter bar can be straight or have various shapes based, for example, on the conformation of the shrubs to be pruned and topped or on the result sought.

According to another characteristic arrangement, the electric motors of all modules of each cutter bar are electrically connected to one another in parallel, with three-wire cables.

According to another characteristic arrangement, a terminal box is associated with the electric motor of each cutting module, this box allowing for the power supply of said electric motor and its parallel connection to the motor of the adjacent module(s) or to the power supply source.

According to another characteristic arrangement, the junction box contains a temperature and overcurrent protection system for the electric motor.

According to another characteristic arrangement, the electric motor of each cutting module is designed so as to be able to rotationally drive the cutting tool of said module, at speeds greater than 3000 RPM.

Interestingly, the electric motor of each cutting module is configured so as to work under frequencies greater than 60 Hertz, for example under a 100 Hertz frequency, so as to prevent electric iron causing overheating of the motor.

According to another characteristic arrangement, the end-shields of the electric motor of each cutting module are shaped and laid out so as to permit, on one hand, the mounting of a protection guard and positioning of the module on a structural frame of the cutter bar, and on the other hand, the clamping of the junction box associated with said module.

According to an advantageous embodiment, the cutting tool of each cutting module is mounted on the motor shaft of the latter with a secure system comprising:

a pin running through a diametral boring ending in a ring groove located in the end of the motor shaft; and
   a mounting strip in two parts, each comprising a notched end to fit in said groove and around its bottom and a blind hole ending at the center of the recess to receive one of the extreme portions of the pin, the cutting tool being attached onto this mounting strip with screws running through holes in said cutting tool and screwing into transverse taps made in each of the two half-parts of the mounting strip.

This mounting prevents ejection of the knives in case the retaining pin breaks.

According to another characteristic arrangement, the end of the drive shaft of each module is provided with two ring grooves with a diametral through hole to allow for an offset mounting of the mounting strips of two neighboring modules so as to obtain a close and staggered mounting of the cutting tools on the cutter bar.

According to another characteristic arrangement, the cutting tools consist of double cutter knifes made out of very high yield strength treated steel with a thickness not exceeding 1.5 mm, each of the cutters comprising a cutting edge and an opposite bent edge acting as reinforcement.

The small thickness of these knives prevents the sap from sticking while reducing inertia. In addition, they can very easily be interchanged and re-sharpened.

According to another characteristic arrangement, the pruning and/or topping machine under the invention comprises an alternator designed to produce three-phase alternating current to supply the electric motors of the cutting modules and rotational drive means for the rotor of said alternator through the heat engine of an agricultural tractor, for example, via the power takeoff, or the fan belt thereof or though the hydraulic system of said tractor.

In summary, because of the above characteristic arrangements of this invention, all above-mentioned disadvantages of trimmer, pruner, topper type machines or alike are eliminated.

It is understood that the parallel mounting of a plurality of electric cutting modules on one single power system makes it possible to mount a significant number of motors connected together only through simple three-phase electric cables. This system generates very little heat and little energy loss. Therefore, it will be very easy to conceive multiple-row toppers on straddle tractors that in addition very often have a very limited hydraulics as well as on grape harvesting machines where it will be possible, because of the easy connection and low energy used, to couple the electric topper under the invention used for the pruning of vine or other shrubs with other agricultural machines that may be used during the same season to perform another job and comprise active components electrically driven from a common power generation source. For example, it will be possible to make topping cohabit with multiple-row spraying. This system will make it possible to perform both operations in one single run, which is a very significant asset with regard to the reduced costs of vine growing-related work.

The easy adjustment of the electric cutting modules should enable the many vine growers to modify their machine and to replace the hydraulic modules with electric modules on the existing frames. This extremely simple operation is within the technical understanding of any vine grower.

BRIEF DESCRIPTION OF THE SEVERAL VIEWS OF THE DRAWINGS

The above purposes, characteristics and advantages and many more will become clearer from the description below and attached drawings.

DETAILED DESCRIPTION OF THE INVENTION

The drawings are referred to describe an interesting, non-limiting, form of embodiment of the modular electric pruning and/or topping machine under the invention.

Depending on the specific work to be performed and/or of the topography of the plantations of trees or shrubs (vine or others) or the type of carrier, the configuration of the pruning and/or topping machines can be very varied. One of the purposes of the invention is to allow for easy adaptation of the architecture of the cutter bars of these machines to the problems resulting from the situation.

In particular, such machines can be, as the case may be, mounted in the front or in the back of an agricultural tractor (for example, between-rows topper, or in the front of a straddle tractor (for example two-row topper), or in the front or back of a multi-function carrier (for example, three-row topper), even on the side.

These machines have a frame B designed to be able to be mounted in a fixed manner onto the chassis of a carrier and whose conformation and dimensions are adapted to the type of carrier and to the results sought. This frame supports arms or mobile carrying components P onto which the cutter bars are attached; means allowing for height adjustment of the position of said bars; adjustment of their spacing and adjustment of their inclination from the vertical or horizontal.

Figure 1:
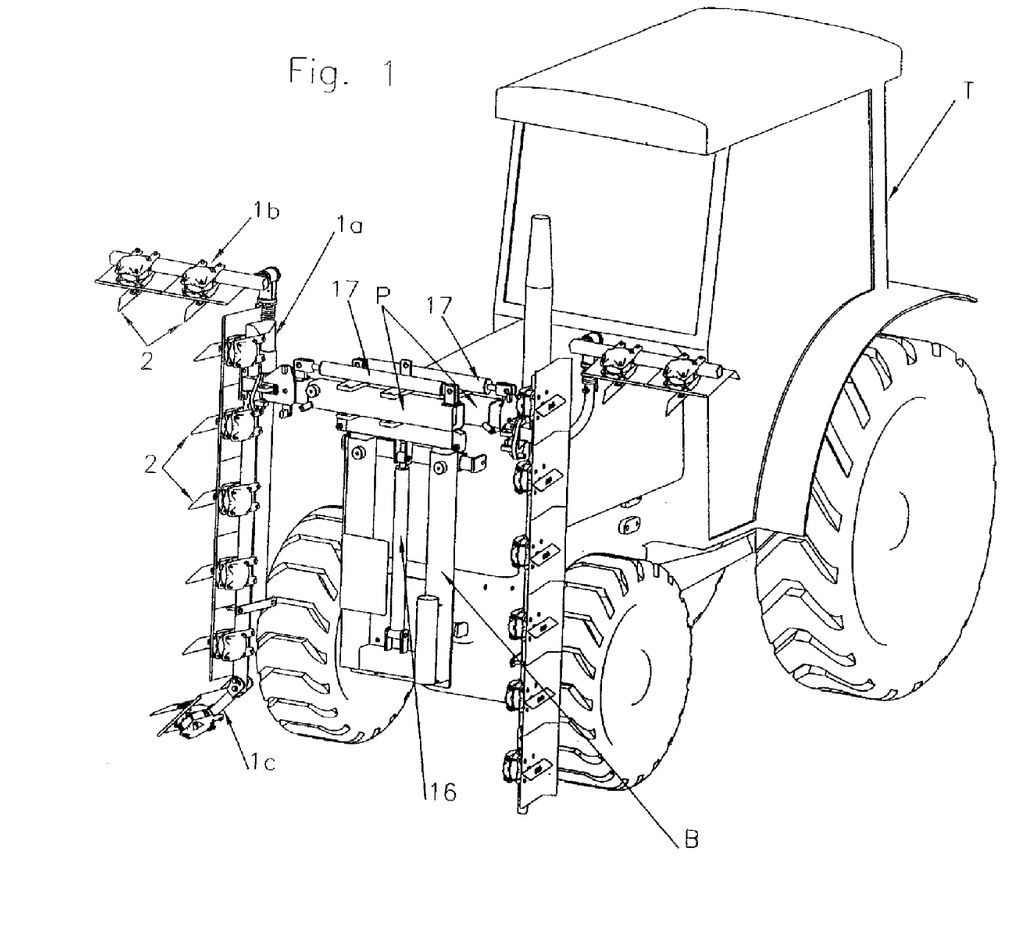
FIG. 1 is a perspective view of one example of a possible configuration for a pruner-topper equipped with a cutting system under the invention.

FIG. 1 shows a so-called "between-rows topper" mounted in the front of an agricultural tractor T.

It is not necessary to describe in detail an example of construction of the frame B and the mobile supporting members P, since these various means that can have varied conformations are well known from a person having ordinary skill in the art.

According to the invention, the machine contains at least one cutter bar 1, 1a, 1b, 1c, . . . basically consisting of the juxtaposition of cutting modules 2 each comprising a rotary cutting tool 3 and a three-phase asynchronous electric motor 4 for individual rotational drive of this tool.

According to an advantageous embodiment, these modules are mounted in a removable and interchangeable manner on an elongated structure 5, preferably made up of a 40×40 mm heavy duty square metal tube or other for example.

Figure 2:
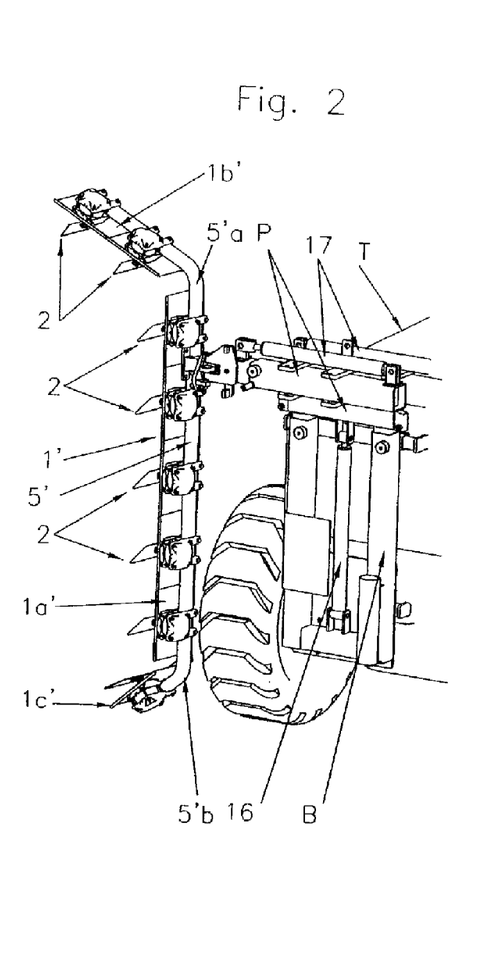
FIG. 2 shows a partial perspective view of one example of a configuration for a multidirectional cutter bar executed under the invention.
Figure 3:
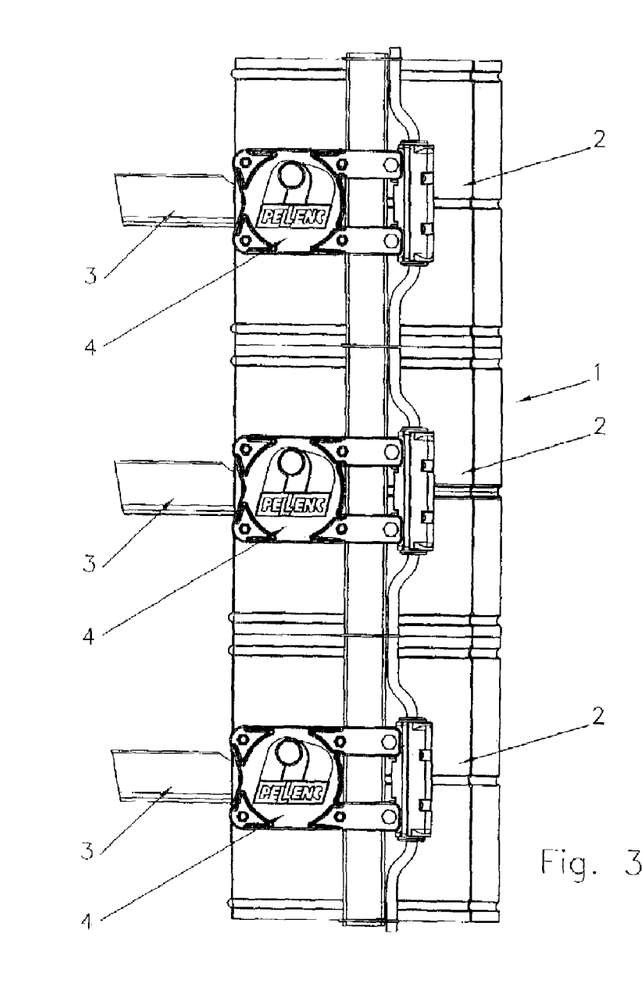
FIG. 3 is an isolated elevation view of a portion of a cutter bar consisting of the juxtaposition of cutting modules, looked at along its inside face.
Figure 4:
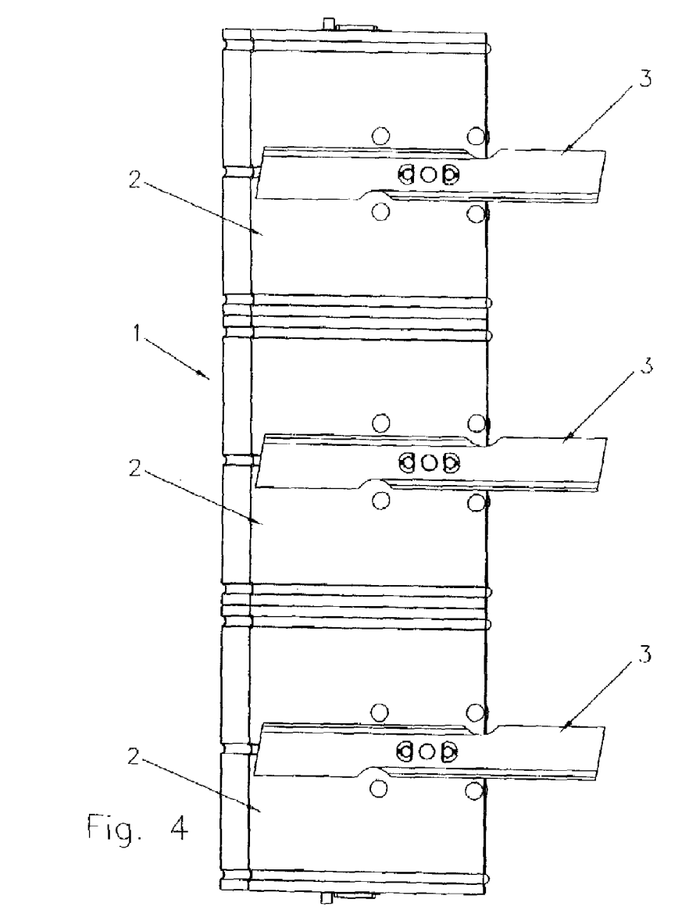
FIG. 4 is another elevation view of this cutter bar portion, looked at along its outside face.
Figure 5:
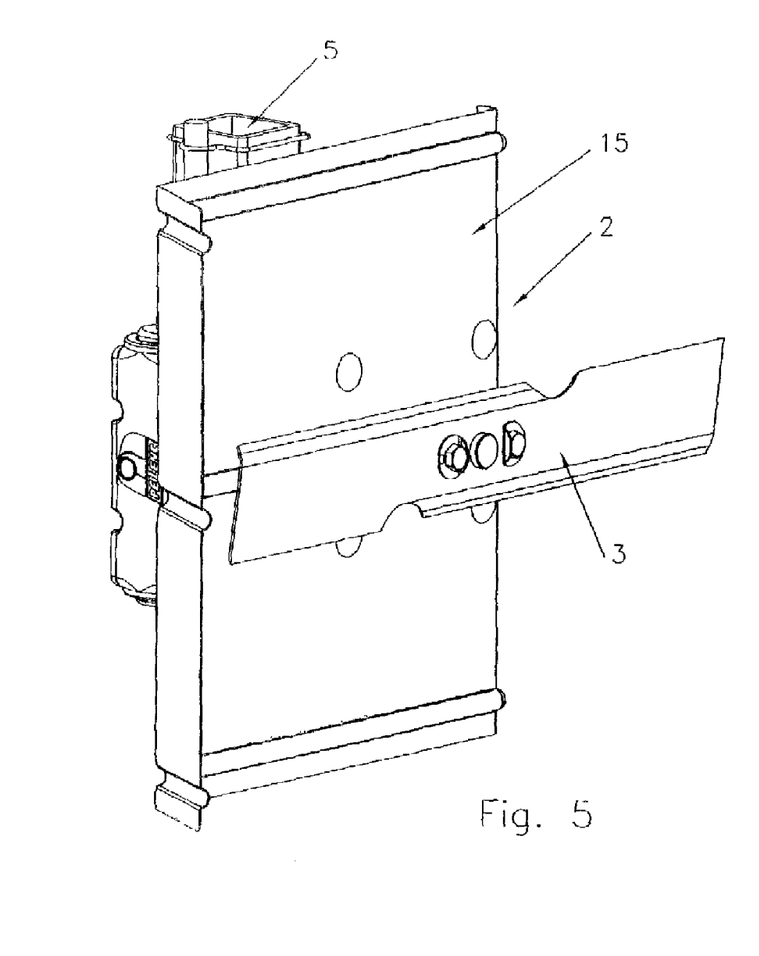
FIG. 5 is a perspective view of a cutting module, looked at along its outside face.

This structural member 5 can be rectilinear so as to achieve a straight cut after mounting the cutting modules (FIGS. 1, 3 and 4). It can also advantageously have a curved portion, obtained for example by bending the tube making up said member so as to achieve a cutter bar with a corresponding bent shape after installing said cutting modules (FIG. 2).

As shown in FIG. 2, it is thus possible to make 1' bent cutter bars consisting of a single structural member 5' onto which several electric cutting modules are mounted one after the other and from one end of said member to the other. This way, a multidirectional cutter bar is achieved comprising an intermediate part 1a', straight or not, capable of performing lateral pruning of the shrubs, a curved upper part 1b' capable of topping the latter and a curved lower part 1c' to cut low branches.

According to a major characteristic arrangement of the invention, the electric motors 4 of the cutting modules 2 are three-phase asynchronous electric motors. These three-phase asynchronous electric motors have been designed to work under continuous conditions with high efficiency, for example 92% efficiency; they can sustain high wattage up to 1 KW, without any risk of deterioration. An internal system (known in itself) makes it possible to protect the motor against potential overheating.

Advantageously, the electric motor 4 of the cutting modules is configured to be able to drive the cutting tool at high speeds greater than 3000 RPM.

The electric motors 4 of modules 2 are electrically connected in parallel to one another through small section three-wire cables 6.

According to another advantageous arrangement, a terminal box 7 (FIGS. 8 and 9) is associated with the electric motor 4 of each cutting module 1, this box allowing for the power supply of said electric motor and its parallel connection to the motor of the adjacent module(s) or to the power supply source.

Figure 8:
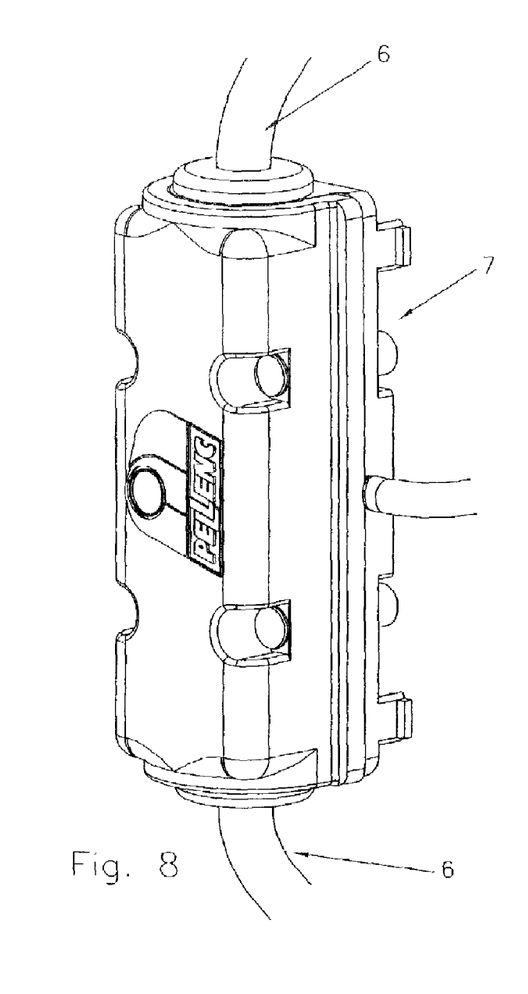
FIG. 8 is a perspective view of an electric box supplying the electric motor and of its parallel connection with the electric motor of the adjacent cutting module or modules or with the source of three-phase alternating electric current.
Figure 9:
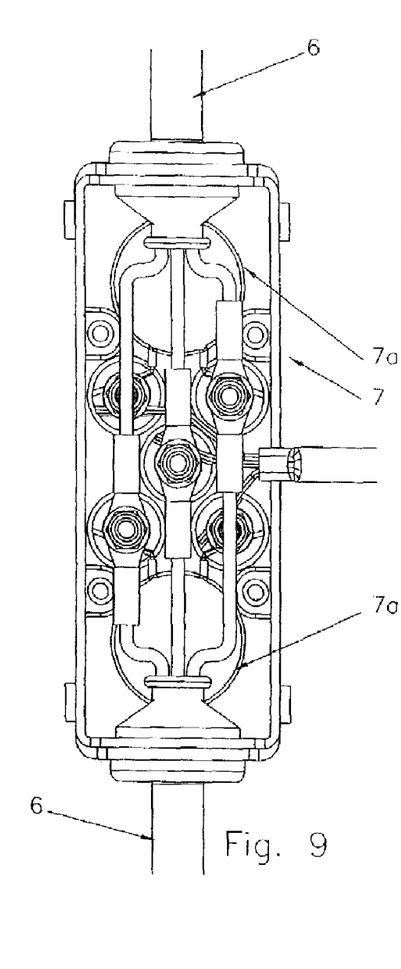
FIG. 9 is an axial cross-sectional view of this box.

The junction box 7 contains a temperature and overcurrent protection system for the electric motor 4 with which it is associated.

This system can consist of cutoff devices 7a for at least two (for example, Ph1 and Ph 3, FIG. 10) of the three phases Ph 1, Ph 2, Ph 3, said cutoff devices consisting, for example, of thermal fuses or current fuses, or of thermal circuit-breakers or current circuit-breakers, or of positive temperature coefficient thermistors (PTC).

Figure 10:
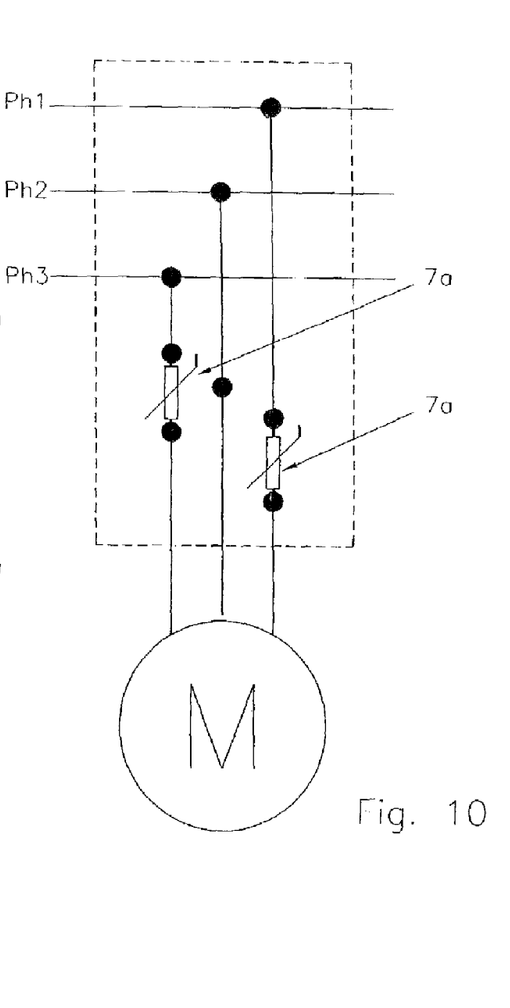
FIG. 10 is a schematic view of a diagram of the box electric circuit.

This protection system makes it possible to prevent any damage to the motor in the event that the tools lock during operation. It makes it possible to shut down the motor in case of overtemperature or in case of overcurrent. It can for example of the auto-reset type.

Figure 11:
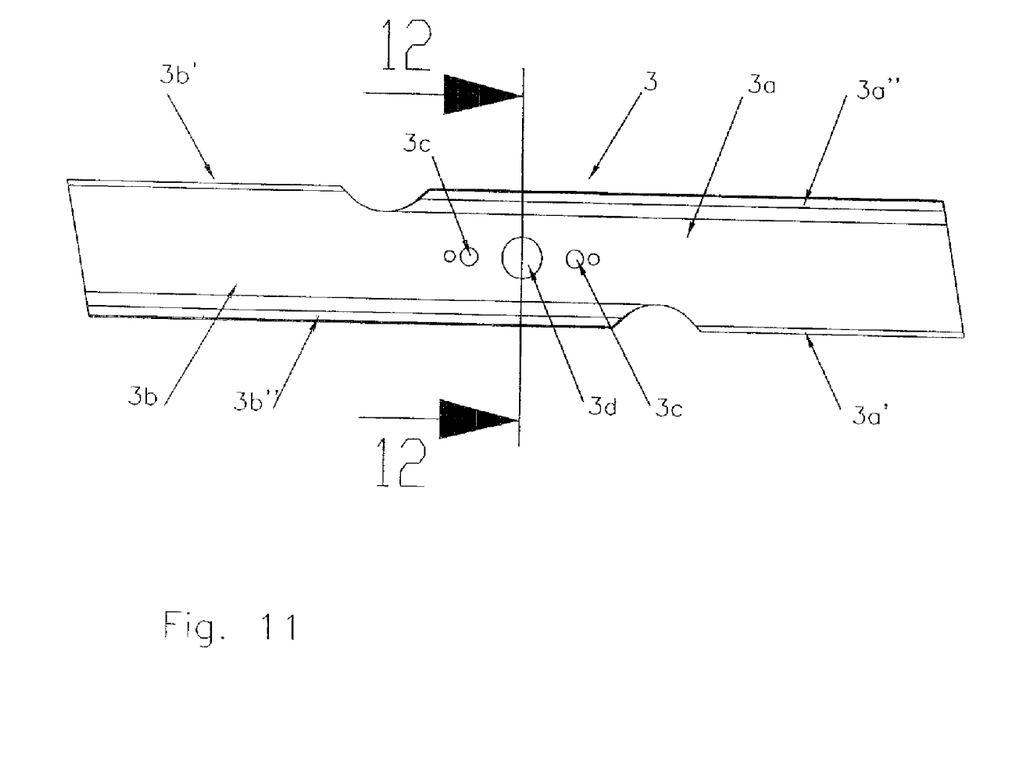
FIG. 11 is a front elevation view of one embodiment of the knife making up the cutting tool of the cutting modules.
Figure 12:
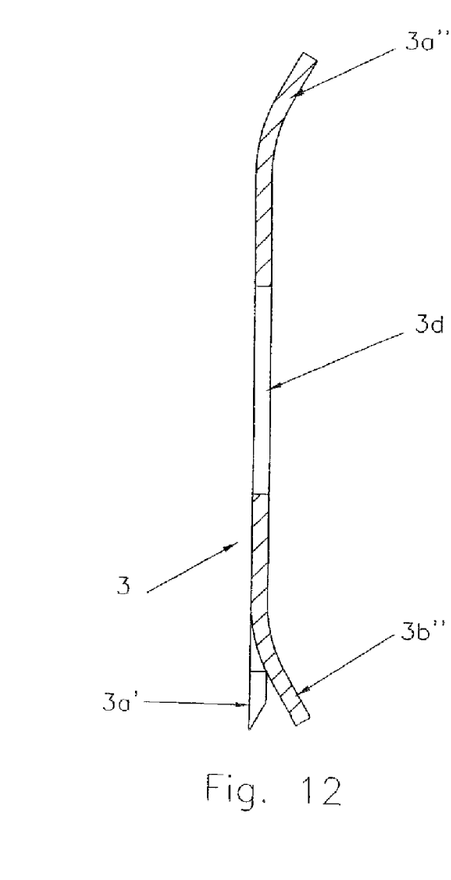
FIG. 12 is a sectional view along line 12-12 in FIG. 11.
Figure 13:
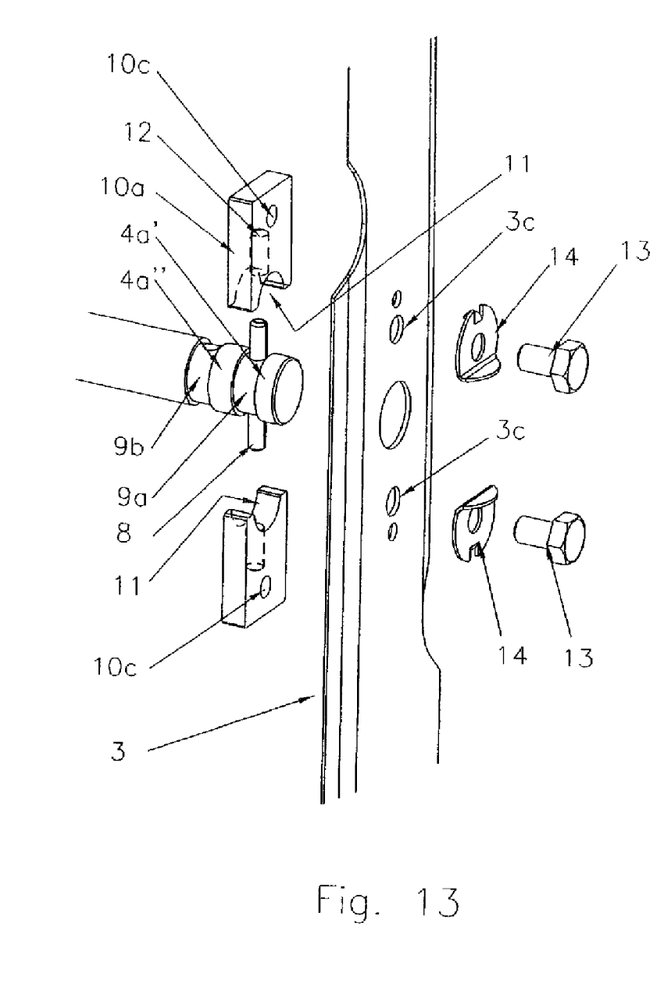
FIG. 13 is an exploded perspective view showing the secure means of attachment of a rotary knife onto the end of a motor shaft.
Figure 14:
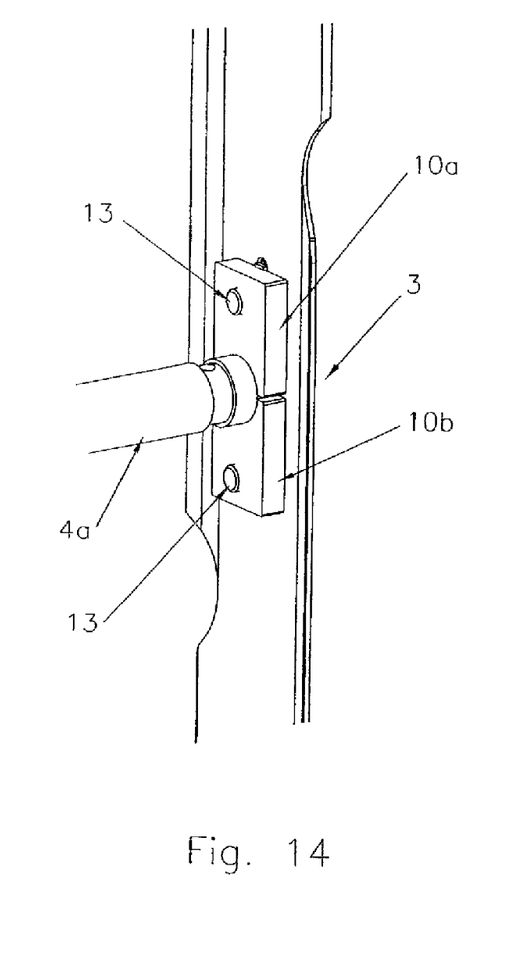
FIG. 14 is a perspective view showing the attachment of this knife onto said end.
Figure 15:
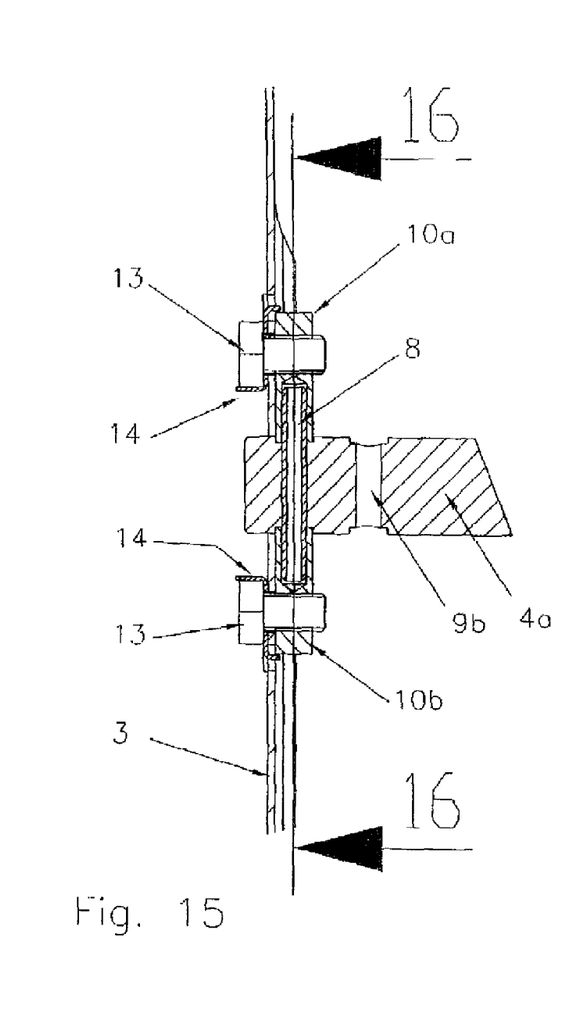
FIG. 15 is a diametral cross-sectional view of this attaching device.
Figure 16:
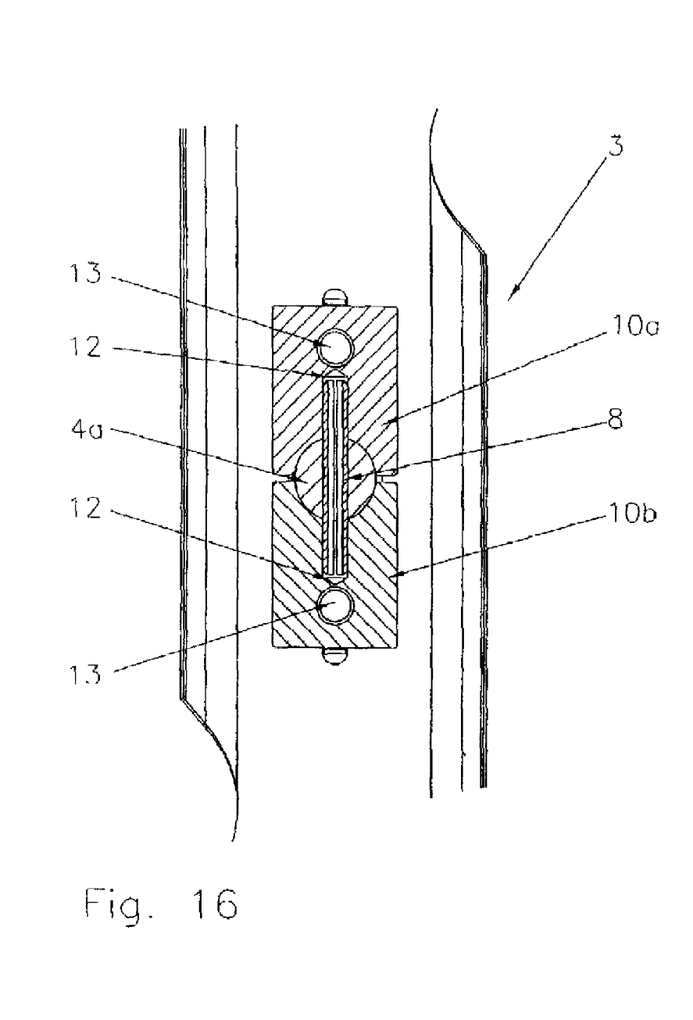
FIG. 16 is a sectional view along line 16-16 in FIG. 15.

The cutting tool 3 of each cutting module 2 advantageously consists of a double-cutter knife 3a, 3b (FIGS. 11 and 12) made out of very high yield strength treated steel with a thickness not exceeding 1.5 mm, each of the cutters 3a, 3b comprising a cutting edge 3a', 3b' and an opposite bent edge 3a", 3b" acting as reinforcement. The knives can advantageously have a (diameter) length of approx. 34 cm.

Each knife 3 is mounted on the motor shaft 4a through a secure attachment device that prevents ejection of the blades in case of failure.

According to the embodiment shown in FIGS. 13 through 16, this device comprises:
- a pin 8 running through a diametral boring ending in a ring groove 9a provided in the end of the motor shaft 4a;
- a mounting strip in two parts 10a, 10b, each comprising an end provided with a notch 11 to fit in said ring groove 9a around its bottom and a blind hole 12 ending at the center of the notch 11 to engage one of the extreme portions of the pin 8; and
- screws 13 running through holes 3b made in the thickness of knife 3 and screwing, respectively, into a transverse tap 10c located in each of the two half-parts 10a, 10b of the mounting strip.

Lockwashers 14 ensure the locking of screws 13 in the mounting position of knife 3.

In addition to the very easy assembly and disassembly of the knives, the advantage of this device is to prevent ejection of said knives due to accidental break of pin 8. As a matter of fact, in this case, the knife 3 would simply be mounted loose on the motor shaft 4a, but not be detached from it.

Preferably, the end of the drive shaft 4a of each cutting module 2 is provided with two spaced-out ring grooves 9a, 9b with a diametral through-boring allowing for an offset mounting of the mounting strips 10a-10b of two neighboring cutting modules so as to obtain a close and staggered mounting of the cutting tools on the cutter bar.

In addition, each cutting tool 3 comprises a central circular opening 3d allowing for its positioning around either cylindrical end portions 4a', 4a" of the drive shaft 4a.

Figure 6:
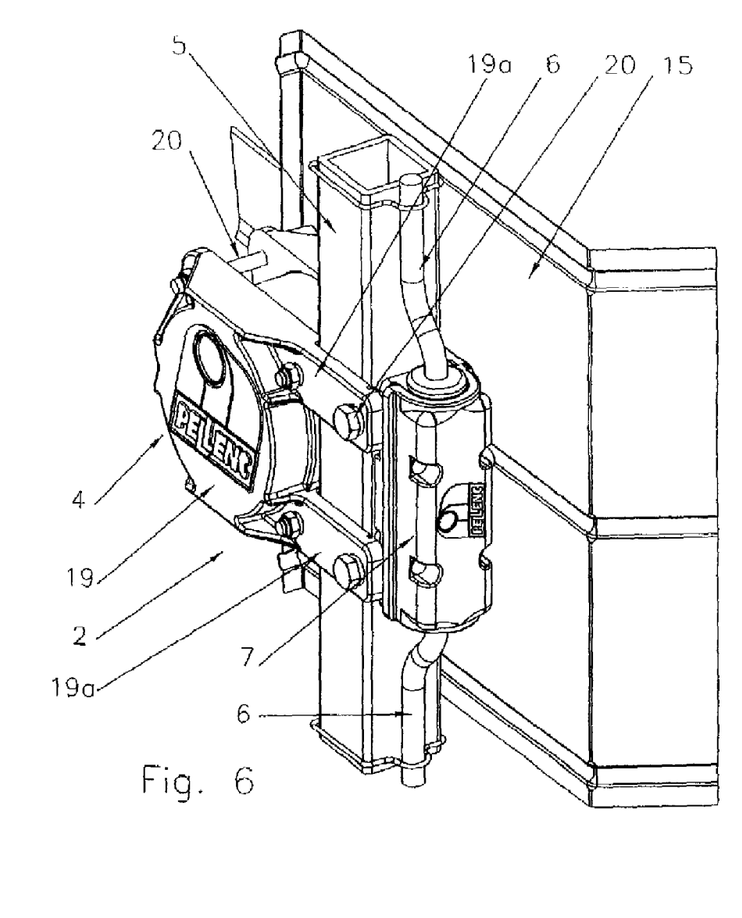
FIG. 6 is a perspective view of this module, looked at along its inside face.
Figure 7:
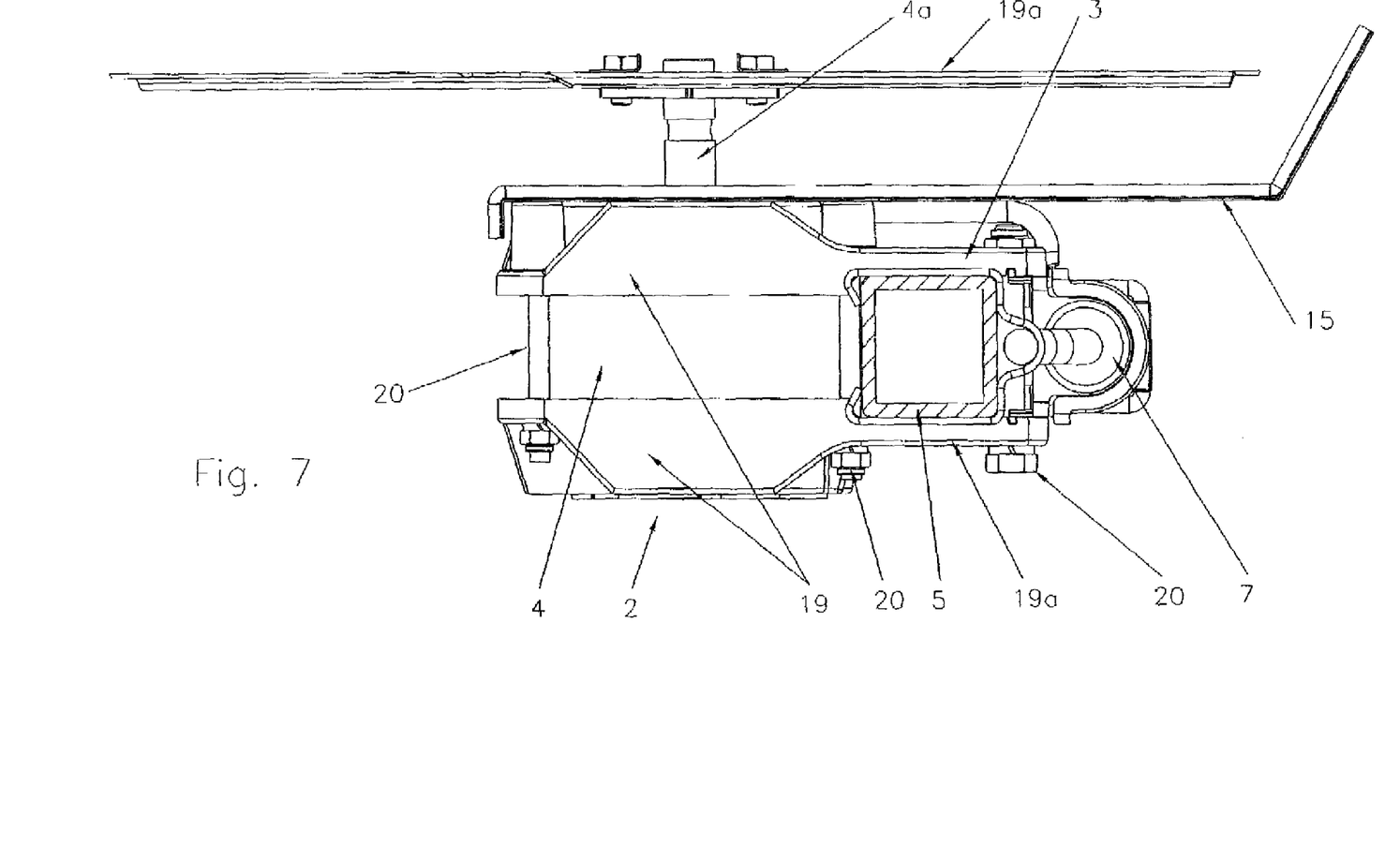
FIG. 7 is a top plan view showing the positioning of this module on a structure consisting of a square tube.

The two end-shields 19 of the bearings of the electric motor 4 of each cutting module are shaped and laid out so as to permit both the mounting of the mandatory deflector or protection guard 15 and attachment of said module onto the structure 5 of the cutter bar 1, for example with bolts 20 (FIG. 6). In addition, they comprise lateral forks 19a ensuring the clamping and holding of the junction box 7 associated with each motor 4.

Figure 17:
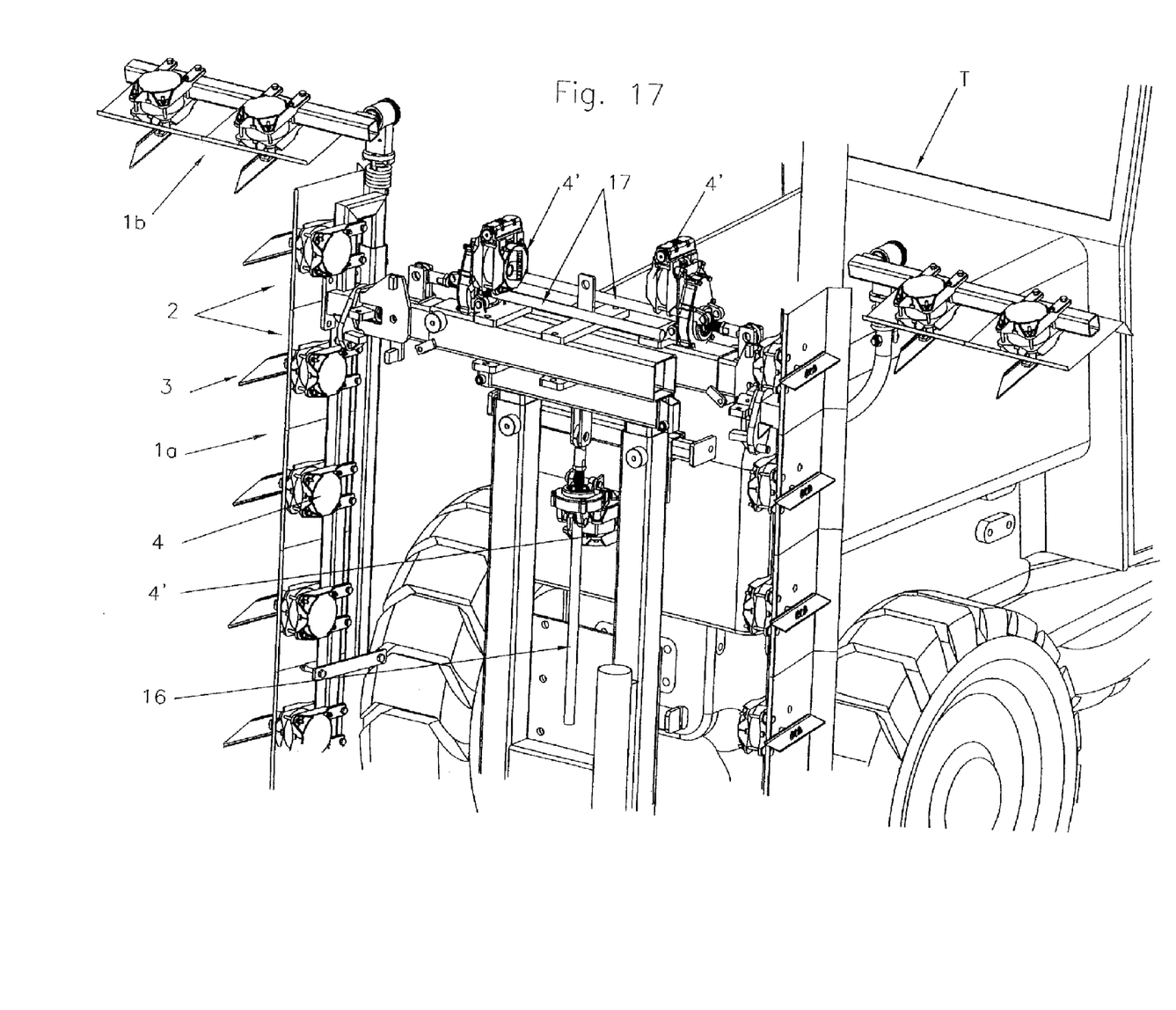
FIG. 17 is a partial perspective view, showing the means of height adjustment and spacing of the machine cutter bars.

Height adjustment and adjustment of the spacing of the cutter bars are advantageously provided by the electric screw jacks 16, 17, respectively, actuated by three-phase asynchronous electric motors 4' identical to those of the cutting modules (FIG. 17). They can be controlled by simple reversing switches available on the market. The members that support the cutter bars and allow for the vertical and horizontal movements of said bars are constructed in the usual manner.

It is also possible to equip the machines, including the machines intended to prune low vines, with vegetation lifting electric modules 18 making it possible to lift the vine stems laying on the ground so as to introduce them into the upper cutter component, such electric vegetation lifters mounted on the lower part of the cutter bars 1 being actuated by three-phase asynchronous motors 4" identical to those of the cutting modules through a reduction gear so as to operate at a reduced speed, for example, approx. 400 RPM.

Figure 18:
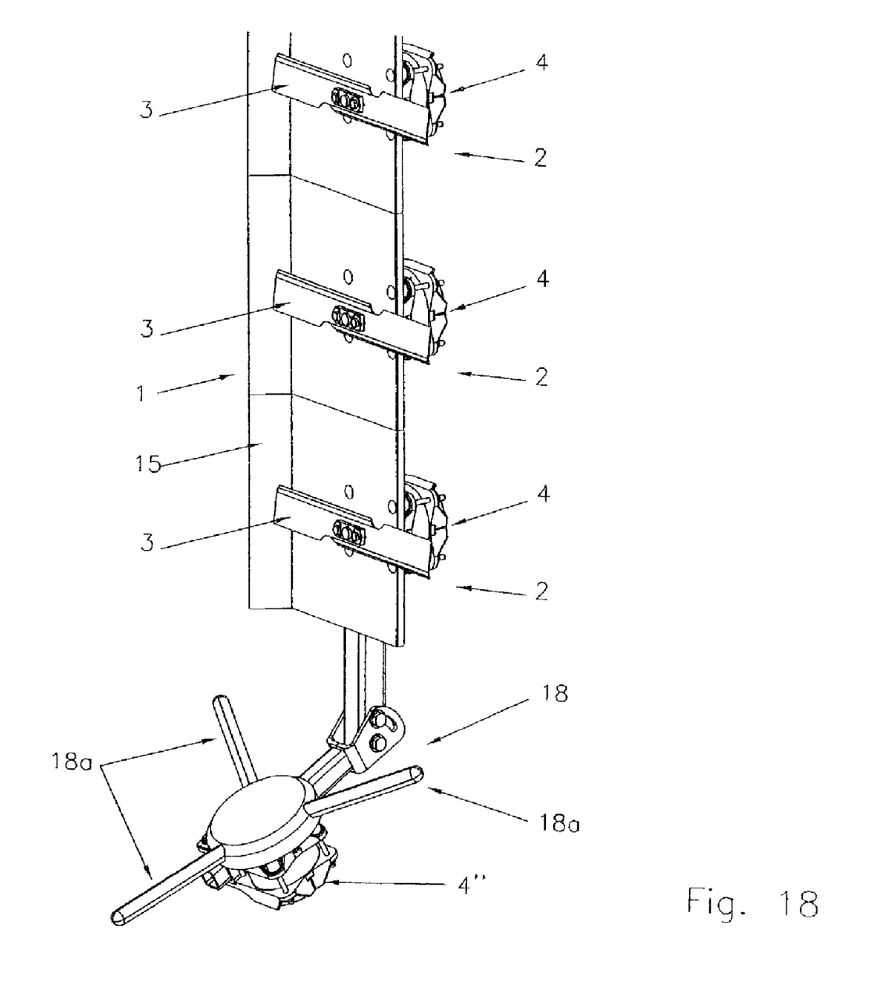
FIG. 18 is a perspective view of one example of construction of a vegetation lifter that equips the low end of a cutter bar.

FIG. 18 shows one embodiment of such rotary lifter 18 equipped with three vegetation lifting radial fingers 18a.

The machine under the invention comprises an alternator configured so as to produce a three-phase alternating current to supply the electric motors 4 of the cutting modules 1 and if necessary to supply motors 4' of the machine electric jacks or motors 4" providing for the rotation of the lifters and rotational drive means of said alternator rotor by the heat engine of an agricultural tractor, for example, via the power takeoff or fan belt thereof or through the hydraulic system of said tractor.

In an advantageous manner, this alternator G is configured so as to produce both a three-phase alternating current, with for example 63 V interphase voltage, and a frequency of approx. 100 Hertz.

The various electric components of the machine under the invention operate under relatively low output voltages, more specifically ranging from 40 V to 75 V. This low voltage is not dangerous, including when certain electric components of the machine are in contact with water during operation; therefore, it offers absolute safety guarantee for users.

The invention also concerns multiple-function machines comprising an electric topper coupled with another agricultural machine that can be used at the same time to perform another job and contains electrically driven active components from a common power generation source, for example consisting of the above-described alternator. For example, such multiple-function machine can consist of a topper coupled with a various treatment product sprayer.

I claim:

1. A pruning machine comprising:
    at least one cutter bar;
    a plurality of cutting modules affixed to the cutter bar, said plurality of cutting modules comprising:
        a plurality of rotary cutting tools; and
        a plurality of three-phase asynchronous electric motors in which each of said plurality of three-phrase asynchronous electric motors is respectively connected to said plurality of rotary cutting tools, the asynchronous motors suitable for imparting rotational motion to the rotary cutting tools, said plurality of three-phase asynchronous electric motors being electrically connected in parallel to each other through three-wire cables;
    a plurality of terminal boxes respectively and separately electrically connected to said plurality of three-phase asynchronous electric motors; and
    a power supply source electrically connected to the terminal boxes, the terminal boxes interconnecting said power supply source to the three-phase asynchronous electric motors.

2. The pruning machine of claim 1, the cutter bar comprising a metal tube, said plurality of cutting modules being removably and interchangeably mounted to said metal tube.

3. The pruning machine of claim 2, said metal tube having a rectilinear shape.

4. The pruning machine of claim 2, said metal tube having at least one curved portion.

5. The pruning machine of claim 1, each terminal box having a protecting means therein electrically connected with the respective three-phase asynchronous electric motor for stopping a flow of current when an overcurrent or an excessive temperature occurs.

6. The pruning machine of claim 5, said protecting means for cutting off current to at least two phases of the respective three-phase asynchronous electric motor.

7. The pruning machine of claim 6, said protecting means being a device selected from the group consisting of thermal fuses, positive temperature coefficient thermistors and a combination thereof.

8. The pruning machine of claim 1, each of said plurality of three-phase asynchronous electric motors suitable for rotationally driving the respective rotary cutting tools at a speed of greater than 3000 r. p. m.

9. The pruning machine of claim 1, each of said plurality of three-phase asynchronous electric motors operating at a frequency of greater than 60 Hertz.

10. The pruning machine of claim 1, each asynchronous electric motor having an end-shield, each end-shield being affixed to the cutter bar, each end-shield having a protection casing affixed thereto.

11. The pruning machine of claim 1, each asynchronous electric motor having a shaft extending therefrom, the cutting tool being mounted on said shaft, said shaft having a ring groove extending circumferentially therearound, said ring groove having a diametrical boring, said diametrical boring receiving a pin therein, the cutting module having a mounting strip with a first part and a second part, each of said first and second parts having a notched end fit in said ring groove, said first part and said second part having a blind hole formed therein, said pin received in said blind hole, the cutting tool being attached to said mounting strip by screws, said screws extending through through-holes formed in said cutting tool, said screw extending into transverse taps formed on said first and second parts of said mounting strip.

12. The pruning machine of claim 11, said ring groove of said shaft comprising a pair of ring grooves in spaced parallel relation to each other, each of said pair of ring grooves having the diametrical boring therein.

13. The pruning machine of claim 1, each cutting tool comprising a double cutter knife formed of a high yield strength treated steel and having a thickness of no more than 1.5 millimeters, said double cutter knife having a cutting edge and a bent edge opposite to said cutting edge.

14. The pruning machine of claim 1, further comprising:
an agricultural tractor having a heat engine; and
an alternating means affixed to said agricultural tractor, said alternating means for producing a three-phase alternating current, said alternating means electrically connected to said plurality of three-phase asynchronous electric motors so as to pass power thereto.

15. The pruning machine of claim 1, said at least one cutter bar comprising a plurality of cutter bars having a height and a spacing, the pruning machine further comprising:
an electric screw jack interconnected to said plurality of cutter bars, said electric screw jack suitable for controlling the height and the spacing of said plurality of cutter bars; and
a screw jack motor connected to said electric screw jack, said screw jack motor being another asynchronous three-phase electric motor.

16. The pruning machine of claim 1, further comprising:
rotary vegetation lifters having a respective electric lifting modules; and
a lifting motor cooperative with the rotary vegetation lifter, said lifting motor being another three-phase asynchronous electric motor.

* * * * *